July 1, 1924.　　　　　　　　　　　　　　　　1,499,770
E. GRUENFELDT
ELECTRIC ARC WELDING
Filed Sept. 1, 1921

INVENTOR
E. GRUENFELDT
BY Lloyd L. Evans
ATTORNEY

Patented July 1, 1924.

1,499,770

UNITED STATES PATENT OFFICE.

EMIL GRUENFELDT, OF CLEVELAND, OHIO.

ELECTRIC-ARC WELDING.

Application filed September 1, 1921. Serial No. 497,586.

*To all whom it may concern:*

Be it known that I, EMIL GRUENFELDT, a citizen of the United States, residing at Cleveland, in the county of Cuyahoga and State of Ohio, have invented a certain new and useful Improvement in Electric-Arc Welding, of which the following is a full, clear, and exact description, reference being had to the accompanying drawings.

This invention relates to joining sheet metal parts by the electric arc welding process.

It is the object of this invention to enable relatively thin sheet metal parts to be readily joined by the arc welding process without deterioration of the metal adjacent the joint due to excessive heating and to provide a joint in which the metal of the electrode can be deposited without producing an unsightly ridge.

A further object of this invention is to provide a backing member having guiding or limiting projections against which the pieces of metal to be welded are tightly held, in order to properly position and space them for welding.

Another object of this invention is to have the limiting projections relatively low as compared to the adjacent edges of the sheet metal parts to be joined so that under the influence of the arc the projections will be quickly melted and the pocket or channel formed by the backing strip and the edges to be joined will be readily filled with additional fused metal which forms a homogeneous joint with the fused parts of the backing strip and sheet metal edge portions.

In the drawing forming a part of this specification, the application of joints produced by this invention is illustrated. The joint, however, may be applied to joining any two sheet metal pieces in which a reinforcing or backing is used.

Figure 1:
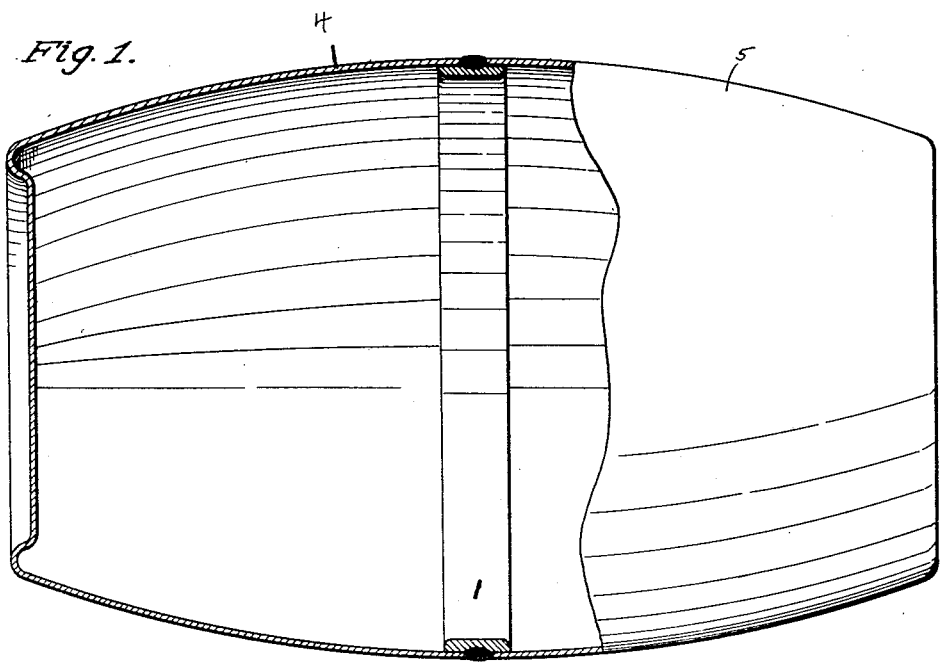
Figure 1 is a view partly in section showing a barrel with the arc welded joint.
Figure 2:
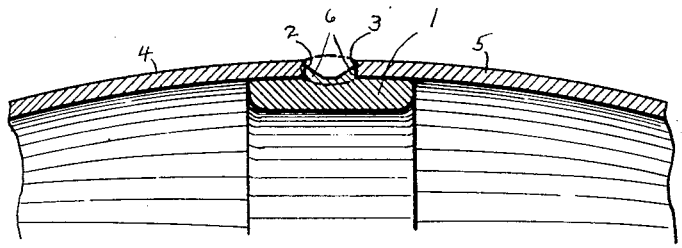
Fig. 2 is a sectional detail view showing the barrel tubs fitting on the reinforcing ring in position to be welded.

In the application of this invention to the joining of barrel tubs the reinforcing ring 1 is sized to fit snugly in the edge portions 2 and 3 of the tubs 4 and 5. The ring has one or more spacing projections 6 which may be either continuous or interrupted. Against these the tubs are forced until they are in engagement therewith. When in engagement, the tubs are properly spaced for welding. The height of the projection 6 should be sufficient to act as a positive stop to the edges of the metal parts against them and may be of any suitable height, except that it is necessary that they should not be as high as the adjacent sheet metal edge portions to be joined, for if they are only about half the height of the edges of the metal parts to be joined it is easier to fuse them under the influence of the arc when filling the channel formed by the edges and the backing strip with electrode metal. In addition to fusing the spacing projections, the intense heat from the arc will be sufficient to fuse the edges of the metal and part of the backing strip, so that the backing strip and edges will be homogeneously united and the channel filled flush with the upper surface of the sheet metal. If the edges of the parts to be joined are held close against a rib member which extends higher than the edges, the welder is very apt to deposit the electrode metal on and around the rib without melting it. This is due to the relatively large volume of the rib member. If the rib member be relatively small, more electrode metal is necessary to fill in the channel and more heat is applied to the rib and adjacent edges, thus melting them and homogeneously uniting them. A joint formed in this manner is actually stronger, due to the reinforcing ring, than a single sheet metal member.

Figure 3:
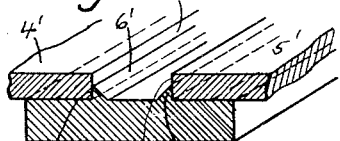
Figs. 3 to 6 illustrate various modifications of the reinforcing or backing strips which may be used for joining any two sheets of metal together.
Figure 4:
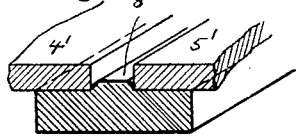
Figure 5:
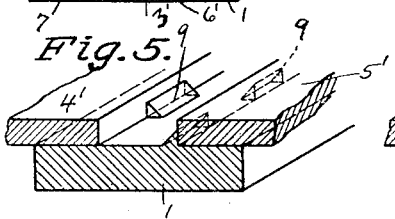
Figure 6:
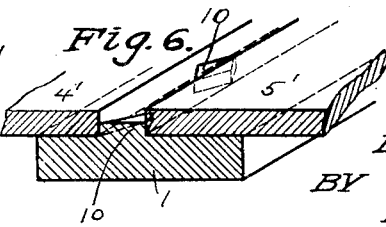

In Fig. 3 is shown a modification in which the spacing projections 6' present straight faces 7 to the edges 2', 3' of the metal parts 4', 5' to be joined, thus making a very firm and positive stop so that the parts to be joined may be held against them with considerable pressure if desired. Fig. 4 shows a modification in which only one rib or spacing projection 8 is formed on the back of the strip. In Fig. 5 the projections 9 are similar to those in Fig. 3 with the exception that they are not continuous. These projections may be formed by machining, by tacking them on, or in any other suitable manner. In Fig. 6 another form of spacing projection 10 is shown which consists of diamond projections which are quite substantial for holding the edges of the parts to be joined separately, but have the advantage of permitting easy melting as well as allowing the electrode material to easily flow around them while they are being fused.

The spacing projections can be designed and provided to best suit the materials to be welded and the width of the space between the edges of the parts to be joined, and it is to be understood that the various types of spacing projections shown can be made integral with the backing bar or secured to the bar in any suitable manner.

In welding, the arc is directed against the outer face of the ring between the ribs or projections 6. The most intense heat will be upon the body of the relatively thick ring 1, but the heat will be sufficient at the edges 2 and 3 of the tubs to fuse the ribs 6 and also the edges 2 and 3, homogeneously uniting the edges of the tubs to the reinforcing ring. At the same time metal from the metallic electrode fills the groove between the edges 2 and 3 flush with the upper surface of the sheet metal.

In case one does not desire to use a metallic electrode a carbon electrode can be suitably used in which case additional metal to be fused is placed in the pocket or channel. Such metal may be in any suitable form such as a wire, rod, pieces, etc.

Having described my invention, what I claim is:

1. A joint produced by electric arc welding comprising a backing bar, a pair of sheet metal members on one face of the bar with their edges spaced, the edges of said sheet metal parts being secured to said bar by fusion of said edges and of spacing projections on the bar between the said edges and electrode metal filling the channel formed by the face of the bar and the edges of said sheet metal parts.

2. An assembly for electric arc welding comprising a backing bar provided with spacing projections, sheet metal parts resting on said bar with their edges against said projections, said projections being of less height than that of the adjacent edges of the metal parts to be joined.

3. The herein described method of joining sheet metal parts which comprises positioning the edges of the sheet metal upon the face of a backing bar having relatively low spacing projections, directing an arc against the face of the bar between the projections to fuse the edges of the sheet metal and the projections, to unite the sheet metal to the backing bar and to fill the groove between the edges of the sheet metal with additional metal.

4. A barrel comprising a central reinforcing ring having a cylindrical face and a pair of parallel ribs on said face, a pair of tubs having their edges fitting against the cylindrical face of the ring and united to said ring by fusion of said edges and said ribs.

5. A barrel comprising a central reinforcing ring having a cylindrical face and relatively low spacing projections thereon, a pair of tubs having their edges fitting against said cylindrical face and abutting said projections, and united thereto by fusion of said edges and projections, the space between the edges of said tubs being filled with metal.

In testimony whereof, I hereunto affix my signature.

EMIL GRUENFELDT.